Feb. 8, 1944.　　　A. E. W. JOHNSON　　　2,341,181
TRACTOR-MOUNTED IMPLEMENT
Filed June 30, 1941　　　3 Sheets—Sheet 1

Inventor
A. E. W. Johnson
By Paul O. Pippel
Atty.

Feb. 8, 1944.　　A. E. W. JOHNSON　　2,341,181
TRACTOR-MOUNTED IMPLEMENT
Filed June 30, 1941　　　3 Sheets-Sheet 2

Inventor
A.E.W. Johnson
By Paul O. Pippel
Atty.

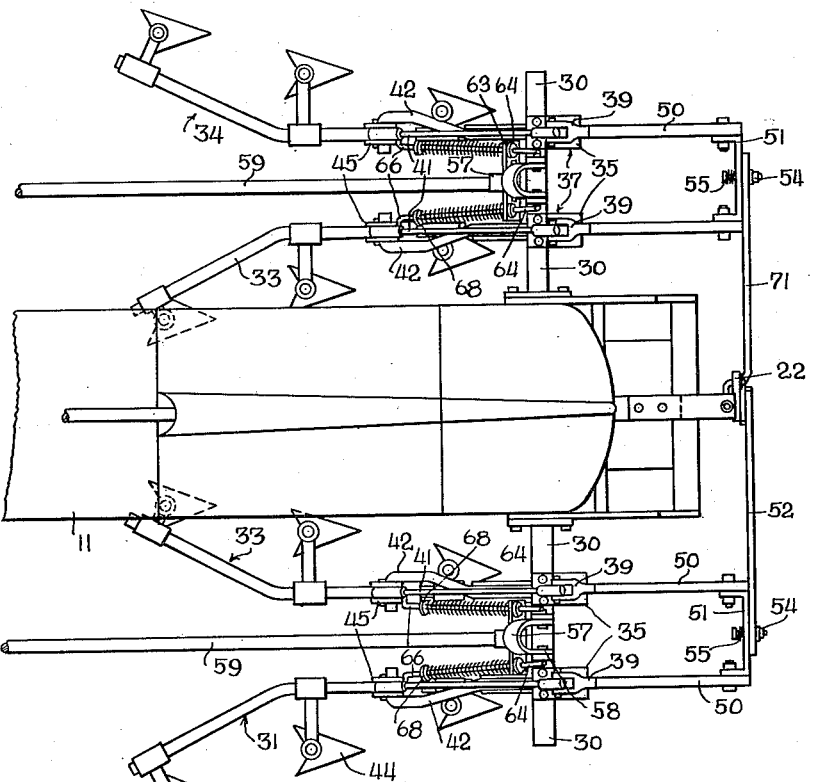
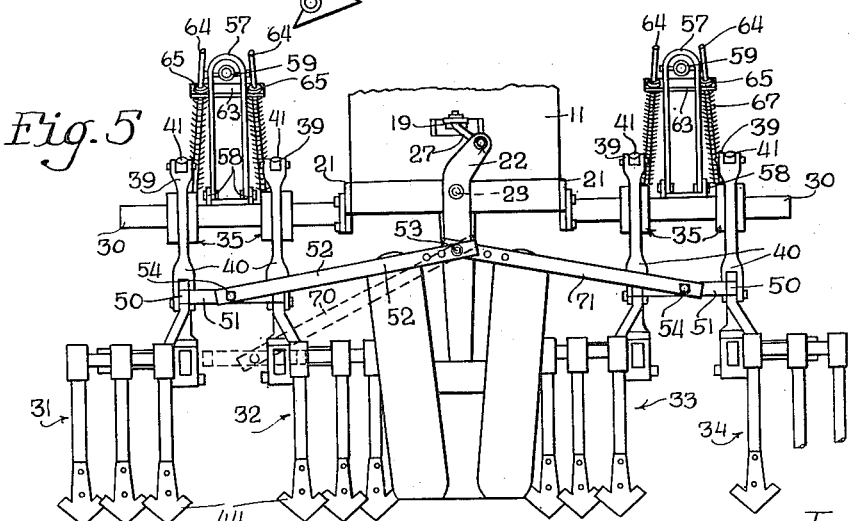

Patented Feb. 8, 1944

2,341,181

UNITED STATES PATENT OFFICE 2,341,181

TRACTOR-MOUNTED IMPLEMENT

Arnold E. W. Johnson, Oak Park, Ill., assignor to International Harvester Company, a corporation of New Jersey Application June 30, 1941, Serial No. 400,362

4 Claims. (Cl. 97—47)

This invention relates to tractor-mounted implements, and more particularly to tractor-mounted cultivators of the type wherein the cultivator rigs are connected to the tractor steering mechanism to be controlled thereby for effecting dodging of certain plants of the plant row being cultivated.

An object of this invention is to provide an arrangement wherein the cultivator rig can be pivoted for movement in a horizontal plane and having at the same time provision for the connection of the cultivator rig to a pivoted bracket by means of parallel links, and wherein the advantages of both a shifting rig type of cultivator and of a parallel link type of cultivator are had in a single tractor-mounted cultivator.

It is another object to provide in a shifting rig type of cultivator adapted for connection with the steering mechanism on the tractor, an arrangement wherein upon the cultivator rigs being moved to their raised position, they will be caused to move laterally from beneath the tractor, this means being inherent and included in the connecting means of the shifting rig with the steering mechanism.

It is another object of the invention to provide one of the parallel links used for connecting the cultivator rig with the pivotal bracket with an extension to provide a portion to which the cultivator attachment can be connected to the steering mechanism, making thereby simplicity of construction.

According to the present invention, each of the cultivator attachments is a separate unit including a bracket structure, a cultivator rig, and parallel links for connecting the rig to the bracket structure for vertical movement with respect thereto. The bracket structure is in turn connected to the tractor or tool-supporting means for pivotal movement about a vertical axis and in a horizontal plane. One of the parallel links in its connection with the bracket structure extends forwardly beyond its connection thereto and serves as a portion of the cultivator attachment to which the same can be connected to the steering mechanism of the tractor. Thus, as the steering mechanism of the tractor is operated, the cultivator rig will be moved laterally in and out from underneath the tractor, all depending upon the amount of steering movement given to the steering mechanism. Since the cultivator rig is connected to the bracket structure by means of parallel links, the full advantage of parallel links is obtained in a shifting rig type of cultivator. Means is provided on the tractor or tool-supporting means for vertically moving the cultivator rig with respect to the pivotal bracket structure to bring the cultivating rig out of its cultivating position to a transport position. As this moving means is operated and due to means included in the connection of the cultivator attachment with the steering mechanism, the extension of the parallel link is caused to be deflected and in a direction such that the cultivator rig being on the opposite side of a pivot is automatically withdrawn outwardly from beneath the tractor upon being brought to its transport position. The connection of the extension of the parallel link with the steering mechanism is that of a link pivotally connected between the parallel link extension and the steering mechanism, and since the steering mechanism remains substantially rigid during the lifting movement of the cultivator rigs, it serves as a reaction point about which the connecting link can rotate, and since it rotates a considerable extent upon the cultivator rig being lifted, the connecting link will move through an arc of sufficient amount as to cause the extension to move inwardly and consequently to cause the cultivating rig, at the other side of the pivotal connection of the bracket with the tractor, to move outwardly.

For other objects and for a better understanding of the invention, reference may be had to the following detailed description taken in conjunction with the accompanying drawings, in which:

Figure 4 is likewise a plan view of the forward end of the tractor but showing the cultivator rigs located at both sides thereof and showing the lateral position of the rigs when in their ground-working or cultivating position;

Figure 5 is an elevational front view of a portion of the tractor and illustrates particularly well the connection of the steering mechanism with the cultivator attachments.

Figure 1:
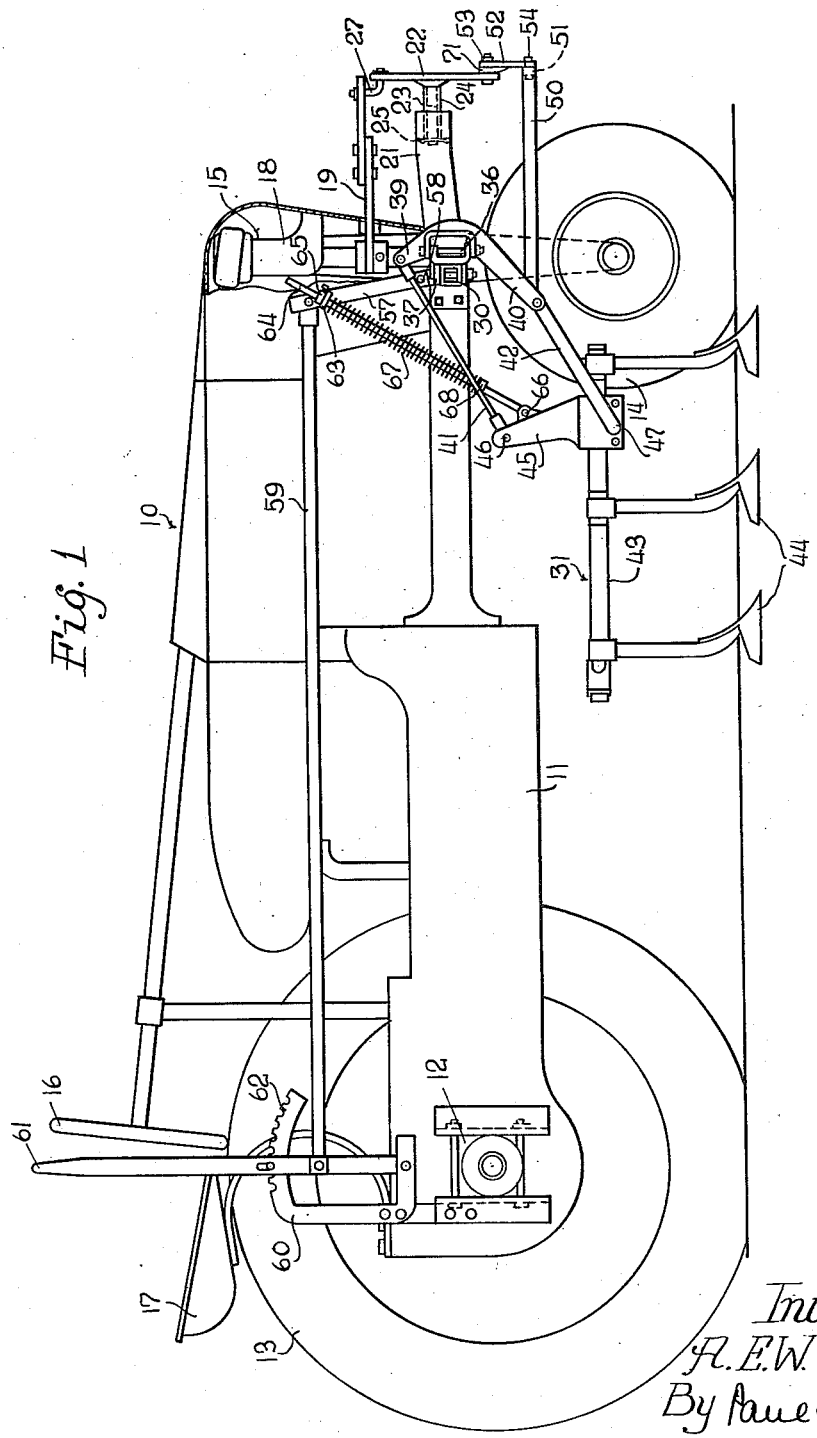
Figure 1 is a side view in elevation of a tractor having the cultivator attachment embodying the present invention attached to the same.

Referring now to the drawings, there is shown a tractor indicated generally at 10 having a central longitudinally extending body portion 11, a rear axle structure 12, to which is connected the rear drive wheel 13, and a steerable wheel 14 for supporting the forward portion of the tractor. This steerable wheel 14 is controlled by a steering mechanism indicated generally at 15 and operated by means of the usual steering hand wheel 16 accessible to an operator's station 17 on the rear axle structure 12 of the tractor. The steering mechanism 15 includes also a vertically extending spindle 18 to which is rigidly connected an arm 19 to be given lateral swinging movement in a horizontal plane upon the steering mechanism being operated to control the steerable tractor wheel 14.

Extending forwardly from the forward end of the tractor is a supporting bracket 21 on which is pivoted a rocking lever 22. This rocking lever 22 has a longitudinally extending axle portion 23 adapted to extend into a sleeve 24 carried by the bracket structure 21. The lever can be retained in its connection with the bracket structure 21 by means of a cotter pin 25. This lever 22, as noted particularly in Figure 5, is substantially centrally disposed on the tractor. The upper end of the lever 22 is laterally deflected and is connected with the arm member 19 by means of a link 27, whereby, as the arm means 19 is moved laterally, the lever 22 will be rotated in a vertical plane about its pivotal connection with the bracket structure 21. The lower end of the lever 22 will thus move from one side of the center point to the other side of the center as the tractor steering mechanism is operated.

Extending laterally from the sides of the tractor are transversely extending members 30, there being one of such members extending laterally from each side of the body portion 11 of the tractor. These transversely extending members serve as a means for the connection thereto of cultivator attachments, indicated generally at 31, 32, 33, and 34, there being two of such attachments on each side of the tractor and connected to each of the transversely extending members 30. These cultivating attachments are arranged in pairs and a single pair is used to operate on a single plant row, the respective cultivator attachments thereby straddling the plant row. It will thus be apparent that the tractor, when taken with these transversely extending members, provides a tool-supporting means to which the various tool-supporting means or working tools can be attached.

Figure 2:
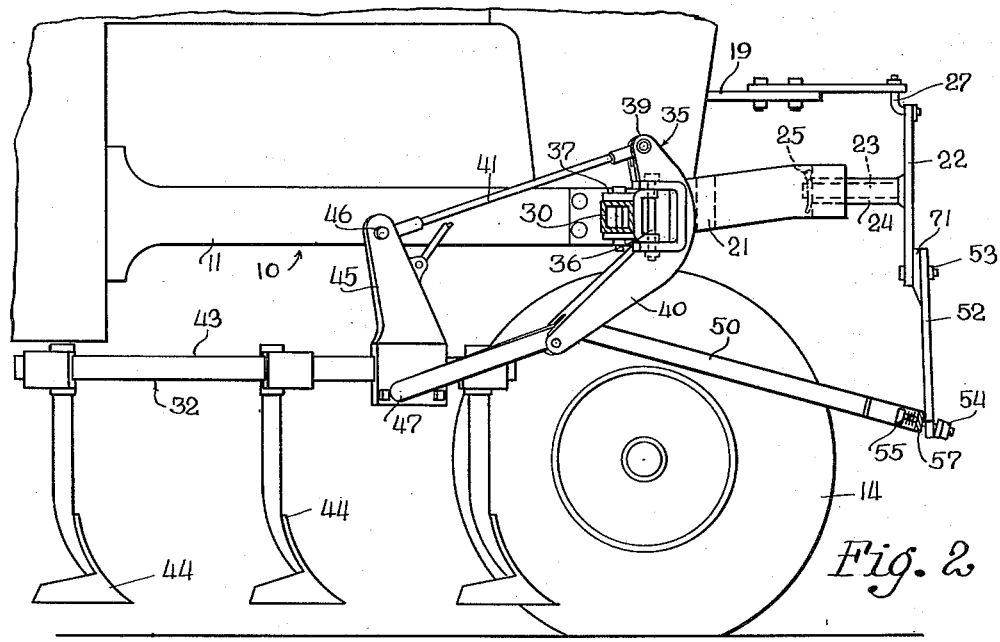
Figure 2 is an enlarged view in elevation of the forward end of the tractor, shown in Figure 1, and of the implement attachment connected thereto but with the cultivator rig raised to its transport position.
Figure 3:
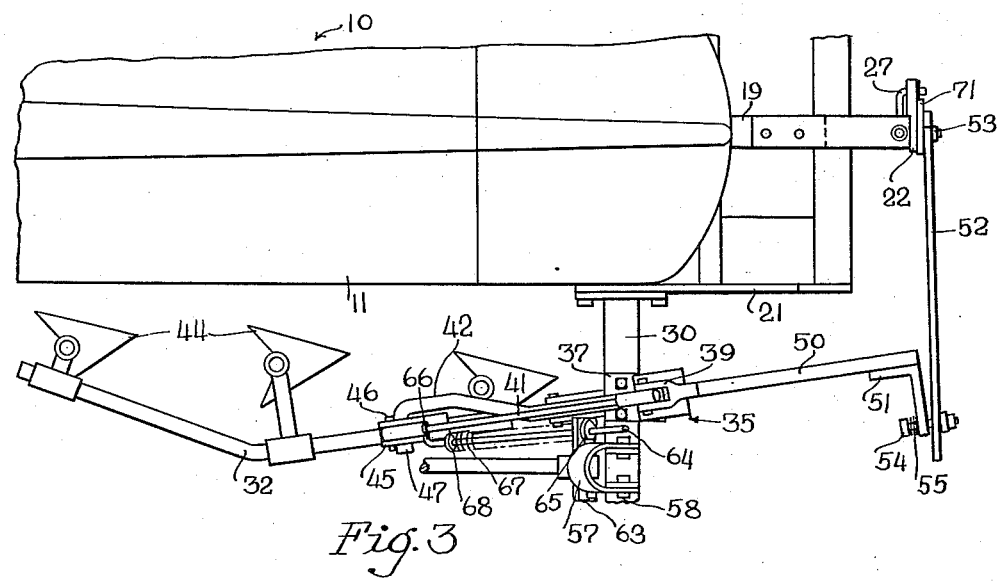
Figure 3 is an enlarged plan view of the tractor and a portion of the cultivator attachment, and showing the lateral position of the cultivator rig with respect to the tractor when in its transport or raised position.

Referring now particularly to Figures 2 and 3, description will now be made of the individual cultivating attachments. Each attachment includes a bracket structure 35 adapted to be pivotally connected to the transverse member for movement about a vertical axis, as provided by a vertically extending bolt 36 in a stationary bracket 37 rigidly secured to the transverse member 30. Extending upwardly from its connection with the bracket 37, the bracket structure 35 is provided with a bifurcated portion 39 and depending downwardly therefrom, there is provided a second bifurcated portion 40. These bifurcated portions serve as means to which there is connected to the bracket structure 35 upper and lower parallel links 41 and 42, respectively. To the rearward ends of these parallel links 41 and 42 is connected a cultivator rig 43 having working tools 44. The cultivator rig includes also a bracket structure 45 serving as means to which can be connected the parallel links 41 and 42, as indicated at 46 and 47. It should now be apparent that there has been provided in a cultivator of the laterally shifting type about a vertical axis, the use of parallel links for the connection of the cultivator rig whereby the advantages of parallel link constructions may now be had in a shifting rig type of cultivator attachment.

The lower parallel link 42 has an extension 50 extending downwardly and forwardly from the connection of the parallel link to the depending portion 40 of the bracket structure 35. Since there are usually two such cultivator attachments used at each side of the tractor, the extensions 50 are connected together at their forward ends by a spacing member 51. This spacing member 51 serves as a means to which the cultivator attachments can be connected to the lower end of the lever 22 to effect guiding of the cultivator rigs by means of steering mechanism 15. This connection is made by means of a link 52 connected to the lower end of the lever 22, as indicated at 53 in Figure 5, and connected to the spacing member 51 by means of a bolt 54 having thereon a spring 55 to permit a certain amount of axial looseness in this connection on the link 52 with the spacing member 51. This looseness is necessary to allow the cultivating attachments to be shifted laterally upon the cultivating rig being raised to its transport position, as can be seen particularly well in Figure 3, wherein the cultivator rig has been moved laterally outwardly from underneath the tractor.

On each of the transversely extending members 30, there is a hairpin lever 57 connected for fore and aft pivotal movement about its connection 58 with the transverse member. To the free end of the lever 57 is connected a longitudinally extending lift pipe 59 extending rearwardly for attachment to a manual adjusting means 60 mounted on the rear axle structure 22 and including a hand lever 61 accessible to the operator's station 17. This hand lever is movable over a quadrant sector 62 and can be located in any position therealong. Proximate the connection of each lift pipe 59 with the free end of its respective lever 57, said levers are provided respectively with a laterally extending flange 63, through an opening in which is slidably connected a lift rod 64 having a collar 65 adapted to cooperate with the flange 63 to effect vertical lifting movement, when the lever 57 is moved forwardly of the cultivator rig 43 to which the lower end of the lifting rod 64 is connected, as indicated at 66. Cooperating with the lifting rods 64 are the usual pressure springs 67 arranged to bear against a collar 68 rigid with the rod 64 and reacting against the flange 63 to thereby normally maintain the collar 65 against the flange 63.

Referring now particularly to Figures 2 and 5, it will be noted that the connecting link 52 with the extension 50 of the lower link 42 will be caused to rotate downwardly about its connection with the lever 22, when the rig is lifted, to assume a position shown in dotted lines at 70. Upon moving to the position 70, the cultivator attachments are swung outwardly from the position shown in Figure 4 to assume the position shown in Figure 3, clear of the tractor. The link 52, upon swinging downwardly causes the extension 50 to be moved inwardly, and hence the cultivator rig at the other side of the pivot from the extension is moved laterally outwardly.

Since these cultivator attachments are used in pairs and there is a pair on the left side of the tractor as well as on the right side of the tractor, this pair on the left side of the tractor is similarly connected to the lever 22 by means of a connecting link 71 which will function similarly to the connecting link 52 upon the cultivating rigs on that side of the tractor being moved to their transport position. However, it will be apparent that the pair of cultivating attachments 33 and 34 on the left-hand side of the tractor will be given movement in an opposite direction from the movement given to the cultivator attachments 31 and 32 on the right-hand side of the tractor. Thus, the respective pairs of cultivating attachments on opposite sides of the tractor are respectively moved outwardly and in opposite directions with respect to each other.

It should now be apparent that there has been provided not only a cultivator attachment in which the advantages of a parallel link construction may be had in a shifting rig or gang type of cultivator but also means cooperating with the steering connection of the cultivator attachments to the steering mechanism for causing lateral outward movement of the cultivating rigs from underneath the tractor upon the cultivating rigs being raised to transport position. It should also be apparent that the connection with the pivotal bracket structure which effects pivotal movement of the cultivator rig is accomplished through an extension of the lower parallel link and is separate of any individual connection with the bracket structure itself.

While various changes may be made in the detailed construction of the present invention, it shall be understood that such changes shall be within the spirit and scope of the present invention as defined in the appended claims.

What is claimed is:

1. In combination, a dirigible tool-supporting vehicle having mechanism adapted to effect steering of the same, a bracket structure having means for the attachment thereto of vertically spaced links, said bracket structure being connected to the tool-supporting means for pivotal movement about a generally upright axis, working-tool means, parallel links for connecting the working-tool means to the bracket structure for vertical movement with respect thereto and consequently with respect to the tool-supporting means, one of said parallel links extending beyond its connection with the bracket structure, and means connecting the parallel link extension with the steering mechanism.

2. In combination, a tractor having a steerable wheel, steering mechanism for effecting steering movement of the steerable wheel, a forwardly extending arm connected to the steering mechanism and adapted to be swung laterally of the tractor, a cultivator attachment including a bracket structure, means for connecting the bracket structure to the tractor for horizontal pivotal movement about a vertical axis, a cultivating rig, means for connecting the rig to the pivotable bracket structure for vertical movement including a portion adapted to move downwardly as the rig moves upwardly, means for vertically moving the cultivator rig, and means for connecting the portion adapted to move downwardly with the said laterally swingable arm, said latter connecting means reacting against said arm to cause the cultivator rig to be pivoted upon the same being moved vertically by the vertical moving means.

3. In combination, a dirigible tool-supporting vehicle having mechanism adapted to effect steering of the same, a bracket structure having means for the attachment thereto of vertically spaced links, said bracket structure being connected to the tool-supporting means for pivotal movement about a generally upright axis, working-tool means, parallel links for connnecting the working-tool means to the bracket structure for vertical movement with respect thereto and consequently with respect to the tool-supporting vehicle, one of said parallel links extending beyond its connection with the bracket structure, means connecting the parallel link extension with the steering mechanism, means for vertically moving the working-tool means, and said connecting means of the parallel link extension with the steering mechanism being so arranged as to effect horizontal pivotal movement of the working-tool means upon operation of the vertical moving means.

4. In an arrangement for carrying a working tool upon a dirigible tool-supporting vehicle having a part movable coordinately with the steering of such vehicle, the combination of a working tool attachment including a bracket structure connected with the vehicle for movement about a substantially upright axis, tool connecting means depending from said bracket structure for connecting said tool therewith, said tool connecting means being adjustable vertically relatively to the bracket structure to change the elevation of the tool and being pivotal with the bracket structure about said axis to change the position of said tool transversely of the vehicle, tool lifting means manipulatable to change the elevation of said tool, and linkage connecting said universally movable connecting means and said part movable coordinately with the vehicle steering for effecting transverse movement of said tool in response to steering of said vehicle, the point of connection of said linkage with said connecting means being spaced from said axis and laterally displaced with respect to the point of connection of said linkage with said movable part, whereby vertical movement of said connecting means will cause lateral movement of the said point of connection of said linkage with said connecting means and movement of said tool transversely of said vehicle.

ARNOLD E. W. JOHNSON.